Dec. 25, 1962
V. DEL ROSSO
3,070,214
CONTINUOUS WEIGHER
Filed Feb. 6, 1961
3 Sheets-Sheet 3
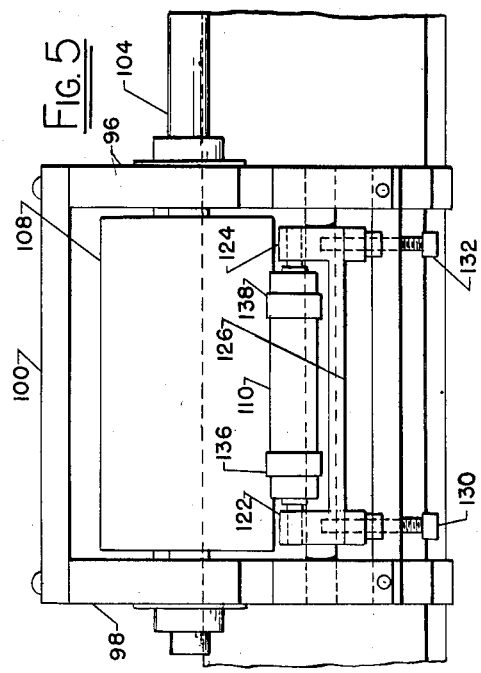
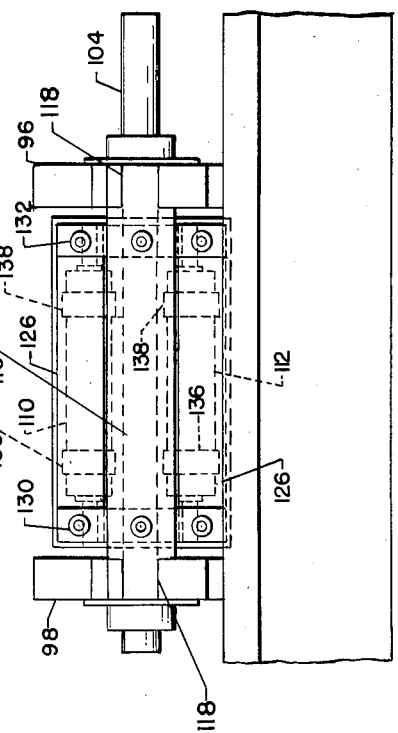
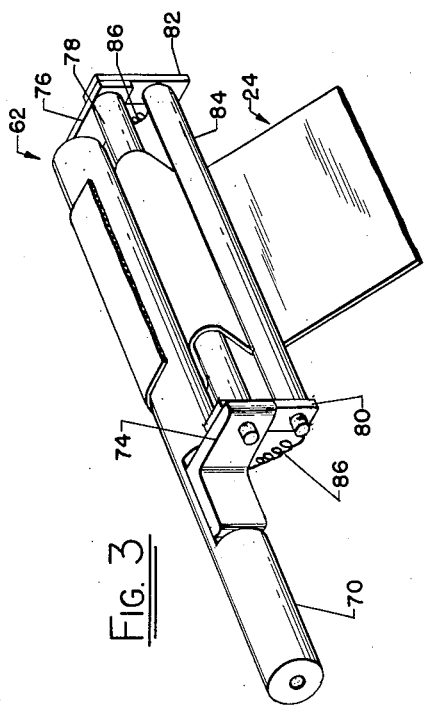
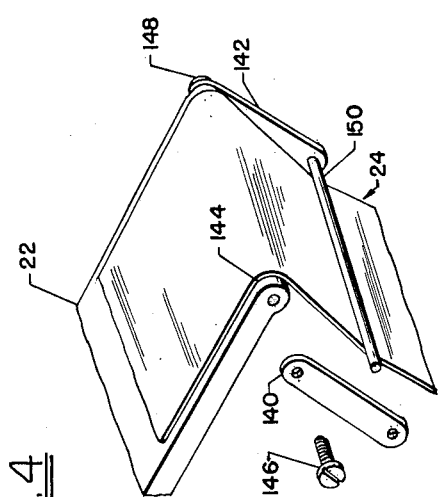
INVENTOR.
Victor Del Rosso
BY
Beau, Brooks, Buckley + Beau
ATTORNEYS United States Patent Office 3,070,214
Patented Dec. 25, 1962

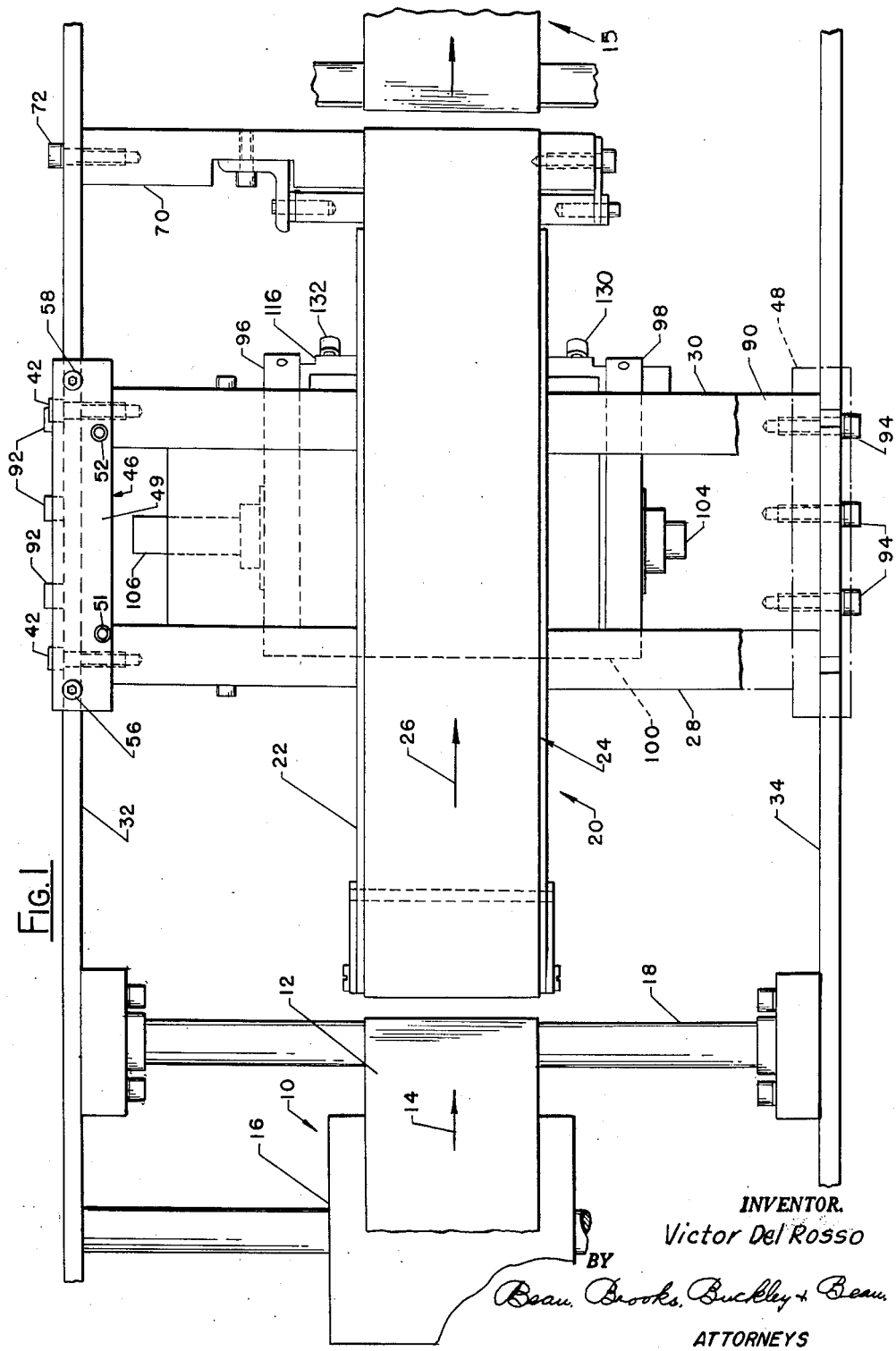

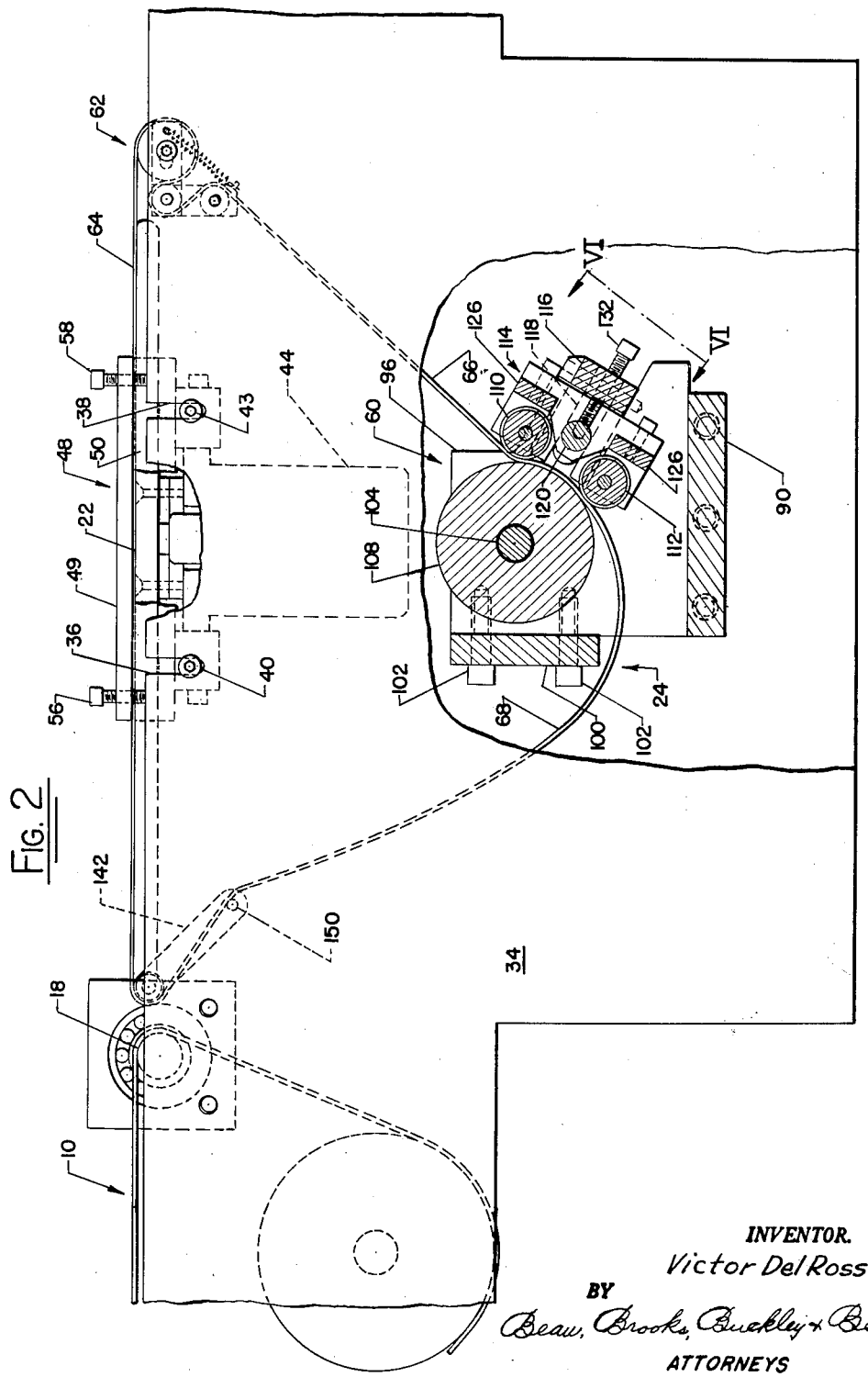

3,070,214
CONTINUOUS WEIGHER
Victor Del Rosso, Ithaca, N.Y., assignor to Hi-Speed
Checkweigher Co., Inc., Ithaca, N.Y.
Filed Feb. 6, 1961, Ser. No. 87,421
8 Claims. (Cl. 198—39)

This invention relates in general to weighing mechanisms and pertains more particularly to a novel conveying and weighing component of a commodity checking system wherein a line of articles, for example packaged goods, are moved through the checking system and are subjected to check-weighing by the novel component according to the present invention.

Of primary concern in connection with the instant invention is the provision of a component mechanism which comprises a weighing device and a conveyor associated therewith and which together form a separate entity within a checking system which includes, in addition to such entity, a conveying means for delivering articles to the conveyor of the present component and a conveying means for receiving the articles from such conveyor. Thus, the present invention in its broader aspects deals with the combination of plural conveying means within a commodity checking system in which one such means is specifically associated with and confined solely to the weighing device.

The above object is of importance because it permits a greater degree of uniformity and accuracy in the weight-checking operation by reason of the fact that variations of the weight-load imposed upon the weighing device by the conveying mechanism, extraneous to the weight of the commodity being checked, may be controlled and/or largely obviated so as to eliminate the introduction of errors in weight from this source. In this respect, conventional systems employ no separate conveying means for the weighing device but associate the weighing device with a lengthy and rather uncontrollable conveyor, usually a belt. Due to load-changing vertical movements of such belts, particularly where high speed operation is involved, it is difficult to obtain an accurate weight check of the commodities involved. The present invention seeks to overcome this problem.

More particularly, an object of the present invention is to provide the combination of a separate endless belt conveyor and a weighing mechanism in which the endless belt has a portion of its flight continuously passing over the platform of the weighing device and wherein the driving and supporting arrangement for the belt is such as to maintain that portion of the belt passing over the platform in predetermined slack condition so that the same may move smoothly and freely over the scale platform without imparting thereto any consequential vertical component such as would impair the sensivity or accuracy of the weighing device.

Further, it is an object of this invention to provide an improved driving and supporting arrangement for an endless conveyor belt in association with a platform weighing device wherein the endless belt is constrained to pass over the platform in such fashion that its movement thereover does not transmit any substantial weight component of the belt itself to the platform. In general, this arrangement is accomplished by having drive imparted to the belt at one point by means of a suitable drive roller having nip rollers acting in conjunction therewith so as to localize the driving force and wherein tensioning means is located just beyond one end of the weighing platform so as to restrict the drive-tensioned area of the belt to a region thereof remote and entirely removed from the platform, leaving the remainder of the belt slack and, most importantly, to leave that portion of the belt which passes over the platform in predetermined slack condition.

Still another object of this invention is to provide support means having a weighing device of the character described wherein the fixed portion of the weighing device is supported by a pair of transverse bars in turn carried by side pieces supported upon but not rigidly affixed to the main frame of the machine whereby the platform of the weighing device may be leveled by adjustment between the side pieces and the frame.

A further object of this invention is to provide an assembly of the character described wherein the weighing platform is horizontally disposed and carries at one end thereof means for constraining the belt to assume a predetermined slack relationship as it passes over the platform and wherein means is located beyond the opposite end of the platform for terminating the drive tension area of the belt such that the portion of the belt moving over the platform is characterized by being in such slack condition as to uniformly move thereover without imparting any significant vertical component upon the platform such as would detract from the sensivity and accuracy thereof. In conjunction with this object, the means on the platform which establishes the predetermined slack relation of the belt passing thereover is so arranged as to impart substantially only horizontal force components to the platform whereas any vertical force components imparted thereto are of negligible character.

Still another object of this invention is to provide a weighing platform-conveyor belt assembly characterized in that the belt is constrained to follow a path of substantially triangular form in which one leg thereof is defined by the belt in passing over the platform and wherein the other two legs are defined by mutually divergent angularly extending legs emanting from a region beneath the weighing platform whereby the later two legs are angularly disposed with respect to the plane of the platform with there being means associated with one end of the platform for guiding the belt thereover so that the stated angularity is effective to contribute negligible vertical components to the platform at this point and wherein, also, the belt is tensioned only in the region of the remaining lower leg portion thereof such that the belt is slack as it passes over the platform and the net effect is to produce negligible vertical components on the weighing platform.

FIG. 1 is a plan view of the weighing assembly constructed in accordance with this invention and showing the same to be located at the discharge end of an article conveying mechanism;

FIG. 2 is a side elevational view of the assembly shown in FIG. 1 with portions broken away for illustrating details of the system;

FIG. 3 is a perspective view showing the tension device for the endless conveyor;

FIG. 4 is a perspective view partially exploded showing one end of the weighing platform and the guide mechanism utilized in association therewith;

FIG. 5 is an enlarged elevational view of the drive assemblage for the endles conveyor belt; and FIG. 6 is a view of the mechanism shown in FIG. 5 taken along the plane indicated by section line 6—6 in FIG. 2.

Referring more particularly at this time to FIG. 1, an endless conveyor mechanism 10 is indicated generally therein which is effective to move commodities placed upon the conveyor belt thereof in the direction indicated by the arrow 14. Disposed in spaced relationship to this conveyor mechanism 10 is a further conveyor mechanism 15 and spanning the gap between these two conveyor mechanims 10 and 15 is conveyor mechanism 20 constructed in accordance with the present invention. The assembly 10 includes a table 16 over which the belt 12 passes and it will be seen that the belt returns after passing over the drive shaft 18 which defines the terminal end of the conveyor assembly 10. The assembly 15 is similarly formed.

An important aspect in accordance with the present invention is the isolation of the conveyor mechanism 20 from the two mechanisms 10 and 15, which several conveyor mechanisms cooperatively form at least a part of the conveying system. In this respect, it will be understood that the purpose of the weighing or checking mechanism is to operate associated mechanism, not shown, which will divert or direct over or under weight commodities from the main stream of commodities moving along the conveying system. Since the entire conveying system may be of substantial length, an important aspect of the present invention is the utilization of the separate conveying mechanism 20 which forms a part of the whole system but which is effectively isolated therefrom to achieve the objectives hereinafter set forth.

The conveying mechanism 20 incorporates as main component parts thereof a vertically moving weighing or scale platform 22 and an endless belt 24 passing thereover so that the articles placed on the belt 24 will be supported upon the platform 22 during their passage thereover toward the discharge end of the assemblage 20 which is to the right in FIG. 1, the direction of belt travel being indicated by arrow 26.

The mechanism which actually performs the weighing operation forms no part of the present invention insofar as the details thereof are concerned. However, the stationary portion of this weighing device or mechanism is supported upon a pair of transversely extending bars 28 and 30 which extend between and abut against the opposite inner surfaces of a pair of generally parallel vertical side plates 32 and 34 which form the main frame portion of the machine.

As can be seen most clearly in FIG. 2, the side plates 32 and 34 are provided with vertical slots or notches 36 and 38 which are transversely alined and register with the opposite ends of the members 28 and 30 and receive therethrough securing means such as the index cap screws 40 and 42 which serve to affix the ends of the members 28 and 30 to the side rails 32 and 34 although adjustably so. The platform 22 is carried by the sttaionary portion of the weighing device, indicated for example by reference number 44 in FIG. 2, and may be leveled by means of supporting bars 46 and 48 disposed at opposite sides of the machine. These bars 46 and 48 are of L-shape configuration in cross section, each having a horizontal leg 49 over-hanging a respective side rail 32 or 34 and a vertical leg 50 extending down to respective ends of the members 28 and 30 and secured thereto as by fasteners 51 and 52 as shown in FIG. 1. Thus, the members 28 and 30 are rigidly affixed to the leveling bars 46 and 48. The overhanging horizontal legs 49 of the leveling bars 46 and 48, see particularly FIG. 2, carry adjustable screw thread members 56 and 58 which bear upon the upper surfaces of members 32 and 34. Thus, the weighing device or scale mechanism may be leveled by means of these members 56 and 58 simply by backing off the fastening elements 40 and 42 to permit vertcial movement thereof within the slots 36 and 38 under the action of the screw thread members 56 and 58 and as soon as a level condition is obtained securing members 40, 42 are retightened so as to fix the members 28 and 30 to the frame of the machine.

As can be seen best in FIG. 2, a drive means 60 is provided below the weighing platform 22 and at one end of the platform 22 is provided a tensioning device indicated generally by the reference character 62 and, further, the platform is provided with means at the end thereof adjacent the conveyor mechanism 10 for guiding the belt 44 over such end of the platform 22. Thus, the belt 24 is actually divided into three basic flight components indicated by reference characters 64, 66 and 68. The flight component 66 is the only one of the three which is tensioned, the other two flight components 64 and 68 being slack although, as will be seen hereinafter, the horizontal flight component 64 which passes over the platform 22 is of predetermined slackness for purposes which will be presently apparent.

The tensioning mechanism 62 can be seen best in FIG. 3 of the drawings and incorporates a fixed bar 70 of circular or rounded cross section in at least that portion thereof with which the belt 24 is engaged. The belt 70 is rigidly affixed from the main frame of the machine as by the fastener 72 shown in FIG. 1 and this belt carries a pair of laterally extending arm members 74 and 76 which serve as a mounting means for a fixed roller 78 and also as mounting means for depending tensioning legs 80 and 82 pivotally attached to the leg members 74 and 76 preferably on the axis of rotation of the roller 78. The depending legs 80 and 82 carry a tensioning roller 84 as shown and spring means such as the tension springs 86 are provided to urge the legs 80 and 82 to carry the tensioning roller 84 against the inner surface of the belt 24 to thereby establish tension in the flight component 66 of the belt and this means 62 actually effects a frictional anchoring point for the belt such that the flight component 64 remains slack as compared with the condition of the flight component 66. The drive assembly 60 is mounted on a transverse plate 90 extending between the opposite side frame members 32 and 34 and is rigidly affixed thereto by fasteners 92 and 94. Fixed to the plate 90 in transversely spaced relationship to each other are a pair of standards 96 and 98, see particularly FIGS. 1 and 2, and these in turn are tied together by a reinforcing member 100 secured thereto by fasteners 102, see particularly FIG. 2. The two standards 96 and 98 have suitable bearings for journaling a drive shaft 104 having one end 106 of extended length for connection to a suitable drive means, not shown. Fixed to the drive shaft 104 between the uprights 96 and 98 is a drive roller 108 which is adapted to engage the inner side of the belt 24 and, cooperable with this drive roller are a pair of nip rollers 110 and 112 which serve to maintain the belt in engagement with the drive roller in the fashion shown most clearly in FIG. 2.

The nip rollers 110 and 112 are movably carried by a framework assembly indicated generally by the reference character 114 guided for movement by a cross member 116 rigidly affixed to the standards or uprights 96 and 98. In the specific construction shown, each of the uprights 96 and 98 is provided with a notch or slot 118 within which the opposite ends of a carrier bar 120 are guidably received, each such notch or slot being alined radially with respect to the axis of rotation of the drive shaft 104 so that the carrier bar or shaft 120 is movable radially relative to the drive shaft 104 and consequently of the drive roller 108. The carrier bar 120 forms part of the framework 114 and has fixed thereto adjacent its opposite ends and just inboard of the uprights 96 and 98 a pair of leg members 122 and 124, see particularly FIG. 5. These leg members are interconnected by transverse frame member 126. The two nip rollers 110 and 112 are journaled between these leg members 122 and 124 and are so positioned relative to each other and to the carrier bar 120 as to engage the belt against the surface of the drive roller 128 substantially in the manner as is shown. A pair of screw threaded adjustment members 130 and 132, see FIGS. 2, 5 and 6, are threadedly engaged in the member 116 and bear against the carrier bar 120 so as to be effective to move the framework 114 toward the drive roller 108 and thus establish a good frictional contact between the drive roller and the belt. To further assure a good grip of the drive roller upon the belt, the nip rollers 110 and 112 are provided with relatively narrow portions 136 and 138 which are raised from their outer surface to localize the gripping action.

Referring at this time to FIG. 4, it will be seen that the left hand end of the platform 22, relative to FIG. 2, is provided with a guide assembly in the form of a pair of depending arms 140 and 142 fixed to the rounded end 144 of the platform by means of fasteners 146 and 148. These arms carry a guide bar 150 at their free ends which engage against the outside of the belt 24 substantially in a manner as is shown. The purpose of this guide assembly is to prevent the slack side of the belt from flapping over the end of the platform 22 and to this end, the arms 140 and 142 are fixed in the proper angular relationship so that the pressure of the guide bar 150 will constrain the belt to pass smoothly up over the end 144 of the platform 22. In this way, a predetermined slack condition of the belt component 64 is achieved so that the same passes smoothly but in slack condition over the platform 22 and so that it does not impart any significant vertical component upon the platform as would tend to detract from the accuracy of the weighing operations. It is to be noted that the bar 150 itself will transmit very little vertical component upon the scale platform 22, most of the force component being horizontal and it will be further noted that the vertical component which is imparted to the platform 22 through the guide bar 150 and its arms 140 and 142 is in an upward direction whereas the inevitable vertical component imparted to the platform by the belt component 64 will be in a downward direction, these two forces tending to cancel each other even though both are relatively insignificant. The net result is a system which is substantially free of any deleterious effects produced by the high linear speed of the belt 24. The assembly 62 acting in conjunction with the drive assembly 60 serves to maintain only the component 66 of the belt in taut condition, the guide assembly or more particularly the guide bar 150 acting to maintain the belt component 64 in a predetermined slack condition and the component 68 exhibits the most slack. Thus the system is balanced by the arrangement of its component parts to effectively achieve the objectives set forth hereinabove.

I claim:

1. A continuous weighing device comprising a weighing mechanism including a vertically movable platform, an endless belt having a flight portion passing over said platform in close proximity thereto, drive means for moving said belt at relatively high linear speeds, and tensioning means engaging said belt adjacent one end of said platform to maintain said flight portion which passes over the platform in slack condition, said device including a main frame having a pair of upstanding side walls between which said weighing mechanism is located, a pair of transverse bars extending between said side walls and removably fixed thereto for vertical movement, a support bar fixed to each of the corresponding ends of said transverse bars with each support bar having a portion overlying a respective side wall, means adjustably carried by each support bar engaging the upper edge of its side wall to elevate the support bars independently end for end relative to the side walls, said weighing mechanism being carried by said transverse bars, said drive means including a drive roller and nip rollers located beneath said platform and engaging said belt therebetween, and guide means carried by the other end of said platform to guide the belt smoothly over such end while maintaining that flight portion of the belt which passes over the platform in predetermined slack condition as to impart no significant vertical force component on said platform.

2. A continuous weighing device comprising a weighing mechanism including a vertically movable platform, an endless belt having a flight portion passing over said platform in close proximity thereto, drive means for moving said belt at relatively high linear speeds, and tensioning means engaging said belt adjacent one end of said platform to maintain said flight portion which passes over the platform in slack condition, said device including a main frame having a pair of upstanding side walls between which said weighing mechanism is located, a pair of transverse bars extending between said side walls and removably fixed thereto for vertical movement, a support bar fixed to each of the corresponding ends of said transverse bars with each support bar having a portion overlying a respective side wall, means adjustably carried by each support bar engaging the upper edge of its side wall to elevate the support bars independently end for end relative to the side walls, said weighing mechanism being carried by said transverse bars, said drive means including a drive roller and nip rollers located beneath said platform and engaging said belt therebetween, and guide means carried by the other end of said platform to guide the belt smoothly over such end while maintaining that flight portion of the belt which passes over the platform in predetermined slack condition as to impart no significant vertical force component on said platform, said drive roller being located relative to said platform such that the portion of said belt between the drive roller and said guide means forms an acute angle with said platform.

3. In a high speed weighing system,
a frame,
weighing means mounted on said frame and including a movable platform having an article-receiving end and an article-discharge end,
endless conveyor means including driving mechanism therefor,
said endless conveyor means including an article-supporting horizontal flight portion overlying said weighing platform between the article-receiving and article-discharge ends thereof,
means for preventing tension-induced vertical force components upon said platform comprising support means mounted on said frame adjacent said discharge end of the weighing platform and over which the discharge end of the horizontal flight portion of the conveyor means is trained,
said endless conveyor means being trained over the article-receiving end of said weighing platform to define the receiving end of said horizontal flight portion of the endless conveyor means.

4. In a high speed weighing system,
a frame,
weighing means fixed to said frame and including a movable platform,
endless conveyor means,
drive means for moving said endless conveyor means,
said endless conveyor means including a horizontal flight portion and depending flight portions extending downwardly from the opposite ends of said horizontal flight portion,
friction-inducing means carried by said frame adjacent one end of said platform and over which said endless conveyor means passes to define the discharge end of said horizontal flight portion and positioning such horizontal flight portion to lie upon the upper surface of said platform,
said endless conveyor means passing over the opposite end of said platform, remote from the last mentioned means, to define the receiving end of said horizontal flight portion.

5. In a high speed weighing mechanism,
a frame,
scale means fixed to said frame and including a movable platform,
endless conveyor means,
a guide member mounted on said frame adjacent one end of said platform and having an upper surface substantially coplanar with the upper surface of said platform,
drive means engaging said endless conveyor means below the level of said guide member, said endless conveyor means passing from said drive means up to said guide member and over the upper surface thereof, thence horizontally along the upper surface of said platform to pass over the opposite end of said platform remote from said guide member, and thence over such opposite end of the platform and downwardly therefrom back to said drive means, the direction of drive of said drive means being such as to move said endless conveyor means in a direction, relative to said platform, from said opposite end of the platform toward said guide member.

6. In a high speed checkweighing system,
a frame,
weighing means mounted on said frame and including a weighing platform,
support means fixed to said frame adjacent one end of said weighing platform,
endless conveyor means having a horizontal flight portion trained over that end of said weighing platform remote from said support means to extend therefrom along and in contact with the weighing platform and then passing over said support means,
drive means for said endless conveyor means moving said horizontal flight portion in a direction towards said support means.

7. An assembly for accurately checking the weights of of articles travelling at high linear velocities, comprising
a frame,
a weight sensitive platform having a receiving end and a discharge end,
endless conveyor means having a horizontal flight portion extending lengthwise of and lying bodily upon said weight sensitive platform,
means for driving said conveyor means to translate articles one-by-one lengthwise over said platform from the receiving to the discharge end thereof,
support means for horizontal flight portion of said conveyor means for maintaining a substantially uniform weight component of said conveyor means acting upon said platform,
said support means consisting of (a) said platform proper upon which the majority of said horizontal flight portion rests, (b) said receiving end of the platform over which one end of said horizontal flight portion is engaged and trained whereby such one end and the majority of said horizontal flight portion remain resting upon and follow the movements of said platform, and (c) a member carried by said frame beyond the discharge end of said platform and over which the corresponding end of said horizontal flight portion is trained.

8. In a high speed checkweighing system, means for supporting endless conveyor means in such manner as to minimize deleterious vertical force component fluctuations due to changes in tension therein as articles are periodically discharged thereonto,
said means for supporting including vertically movable weight sensitive platform means having a receiving end and a discharge end, and guide means fixed relative to said platform means adjacent the discharge end thereof,
endless conveyor means having a horizontally disposed article-supporting flight portion,
said platform means and said guide means constituting the sole support for said horizontal flight portion of the endless conveyor means to minimize deleterious vertical force component fluctuations as aforesaid.

References Cited in the file of this patent
UNITED STATES PATENTS

| | | |
|---|---|---|
| 1,776,419 | Dodge | Sept. 23, 1930 |
| 2,305,484 | Merchen | Dec. 15, 1942 |
| 2,326,098 | Kimmich | Aug. 3, 1943 |
| 2,568,255 | Schieser et al. | Sept. 18, 1951 |
| 2,633,972 | Capstack et al. | Apr. 7, 1953 |
| 2,875,888 | Swain et al. | Mar. 3, 1959 |
| 3,019,884 | Bartelt | Feb. 6, 1962 |